Nov. 17, 1959   R. L. BEYERSTEDT ET AL   2,913,061
FOUR WHEEL DRIVE ARTICULATED VEHICLE

Filed Jan. 24, 1958   6 Sheets-Sheet 1

INVENTORS
RALPH L. BEYERSTEDT
THORVALD G. GRANRUD
Paul O. Pippel
ATTORNEY

Nov. 17, 1959     R. L. BEYERSTEDT ET AL     2,913,061
FOUR WHEEL DRIVE ARTICULATED VEHICLE
Filed Jan. 24, 1958                                         6 Sheets-Sheet 4

INVENTORS
RALPH L. BEYERSTEDT
THORVALD G. GRANRYD

Paul O. Pippel

ATTORNEY

United States Patent Office 2,913,061
Patented Nov. 17, 1959

2,913,061

FOUR WHEEL DRIVE ARTICULATED VEHICLE

Ralph L. Beyerstedt and Thorvald G. Granryd, Libertyville, Ill., assignors to The Frank G. Hough Co., a corporation of Illinois Application January 24, 1958, Serial No. 711,040

18 Claims. (Cl. 180—12)

This invention relates generally to motor vehicles, and more specifically to articulated motor vehicles wherein fifth-wheel steering is provided between the two halves of the vehicle and wherein all four wheels of the vehicle are driven wheels.

Generally, in vehicles of the noted type, the most persistent problem that has occurred in the art is the problem of driving all four wheels of the vehicle. The problem is complicated by the fact that the vehicle is articulated. Generally, only one power plant is used and this is mounted in one of the two halves of the vehicle. The extension of a power train from the power unit to the wheels of the half carrying the power unit is not difficult, however, the extension of a power train from the power unit to the other half of the articulated vehicle does present many problems.

It is the object of the present invention to produce means for driving all four wheels of an articulated vehicle wherein efficient driving of all four wheels of the vehicle is attained.

It is another object of the present invention to provide an articulated motor vehicle having a power unit in one half thereof with mechanical means for driving the wheels of that half thereof and with hydraulic means for driving the wheels of the other half thereof.

A further object of the present invention is to provide means in a vehicle of the aforementioned type wherein the hydraulic means driving one portion of the articulated vehicle may be used to provide additional vehicle braking.

A further object of the present invention is to provide a simple and efficient hydraulic control system for controlling the operation of the hydraulic driving means of one portion of an articulated vehicle wherein a single power plant mounted in the other portion thereof drives the hydraulic driving means for that one portion of the vehicle.

Other objects and features of the present invention will be apparent upon a perusal of the following specification and drawings of which.

The present embodiments are the preferred embodiments but it is to be understood that changes can be made in the present embodiments by one skilled in the art without departing from the spirit or scope of the present invention.

Figure 1:
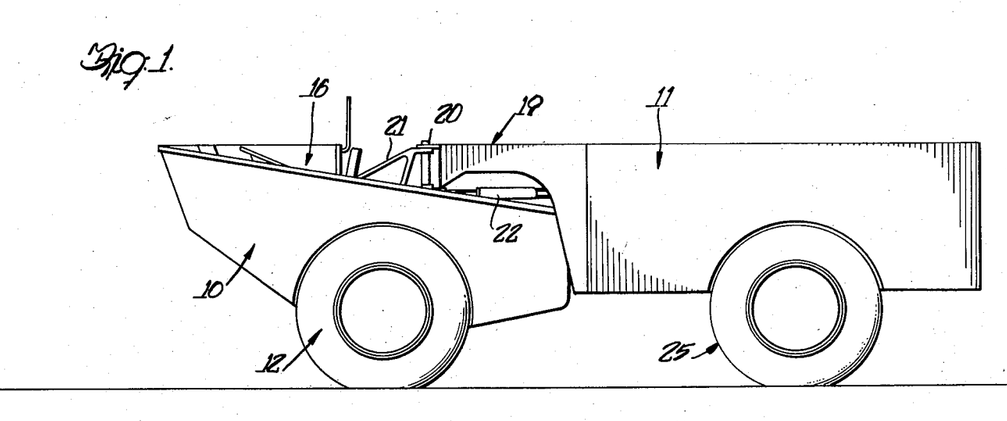
Figure 1 is a side elevational view of an articulated vehicle constructed according to the present invention.
Figure 2:
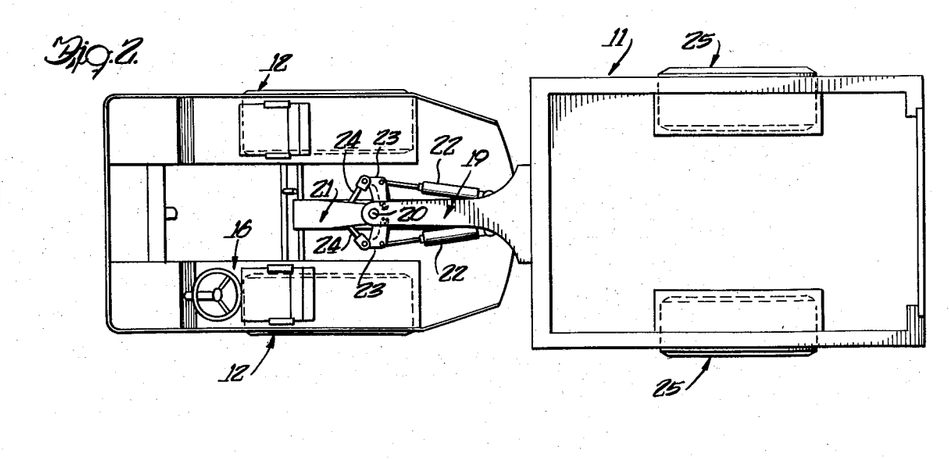
Figure 2 is a top plan view of the structure shown in Figure 1.
Figure 3:
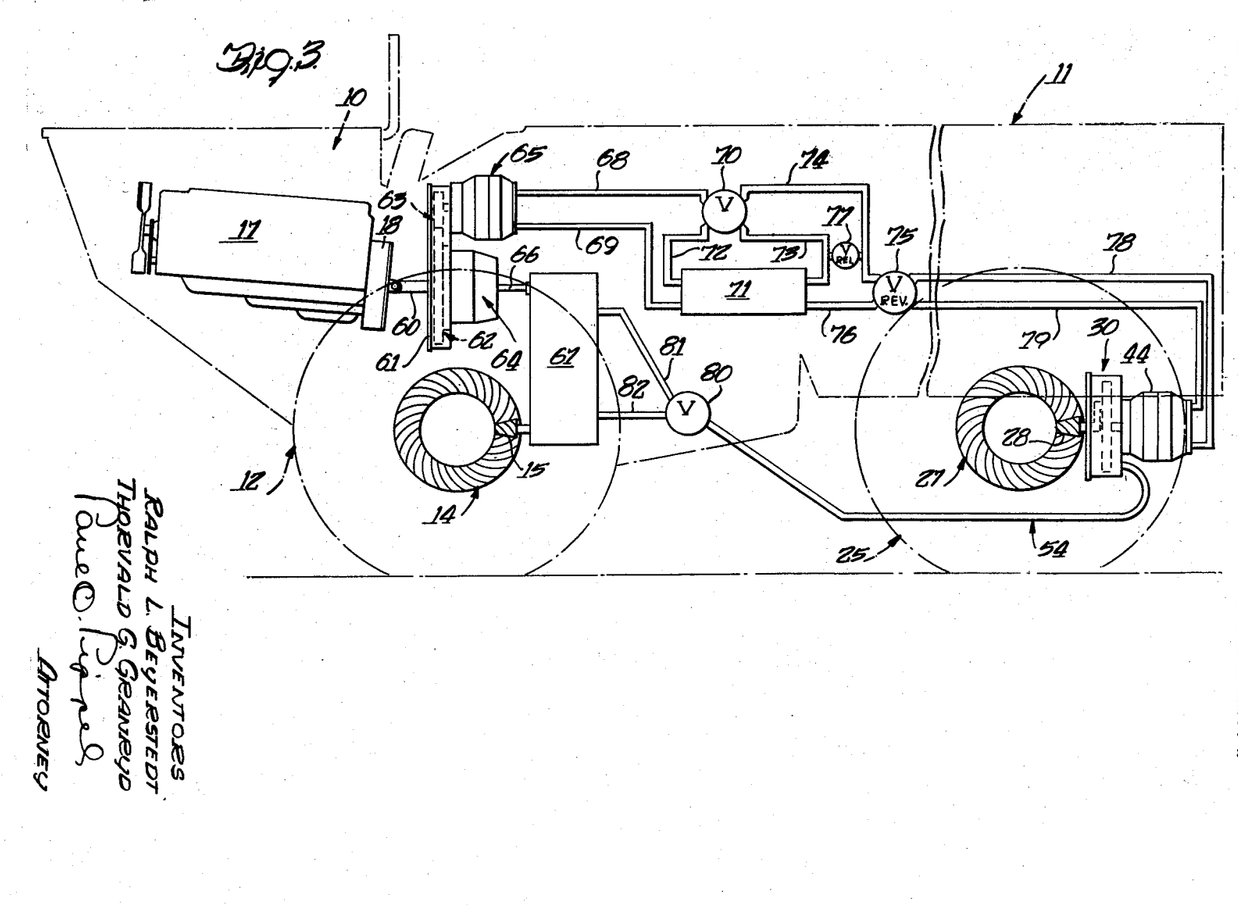
Figure 3 is an enlarged partially diagrammatic view of the vehicle shown in Figures 1 and 2 and provided with one system for driving the forward and rearward wheels thereof.
Figure 4:
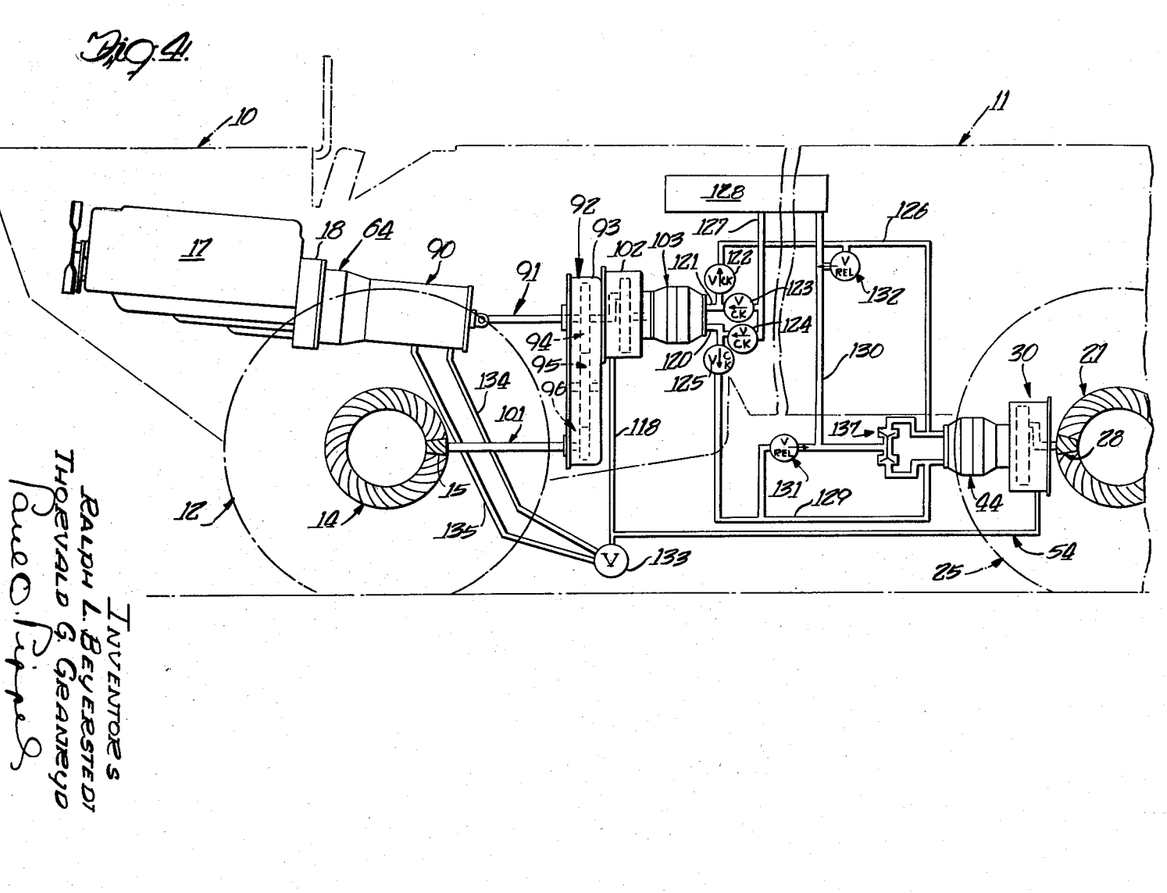
Figure 4 is an enlarged partially diagrammatic view of the vehicle shown in Figures 1 and 2 with a second embodiment of means for driving the forward and rearward wheels of the vehicle.
Figure 6:
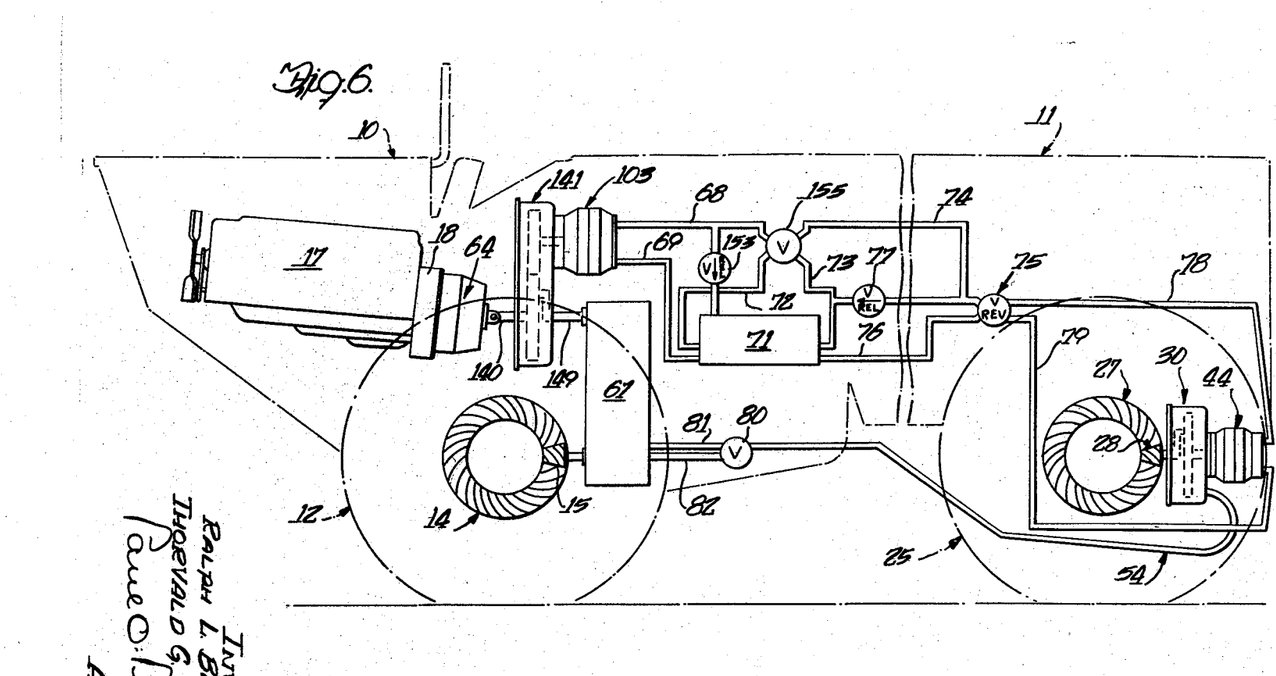
Figure 6 is an enlarged partially diagrammatic view of a vehicle such as shown in Figures 1 and 2 with a third embodiment of the means for driving the forward and rearward wheels of the vehicle.

Generally, the present invention may be described as comprising an articulated tractor of the four wheel rubber tired type having a forward tractor portion or unit and a rearward trailer portion or unit. Fifth wheel steering means are provided between the tractor portion and the trailer portion for steering of the vehicle. The tractor portion includes a power plant or engine and various mechanical means are provided in the tractor portion for extending a mechanical power train from the engine to the wheels of the tractor portion. The trailer portion includes a hydraulic motor for driving the trailer wheels. Various hydraulic systems for driving the hydraulic motor of the trailer unit are connected between the engine in the tractor portion and the hydraulic motor of the trailer portion. As for the first embodiment, shown in Figure 3, the hydraulic motor in the trailer unit is driven by a hydraulic pump mounted in the tractor portion and the pump in turn is driven from a power take-off unit on the input side of a torque converter. The torque converter, which is connected to the tractor engine, through the power take-off unit, in turn drives a transmission which in turn drives the wheels of the tractor portion. As for the second embodiment as shown in Figure 4, the hydraulic motor driving the wheels of the trailer portion is driven by a hydraulic pump carried by the tractor portion, and this hydraulic pump is driven by a planetary type step-up unit. The planetary type step-up unit is driven from a transfer drive unit which also drives the wheels of the tractor portion. The tractor engine is connected to operate a torque converter and the torque converter in turn drives a transmission unit which in turn supplies power to the transfer drive unit. As for the third embodiment, as shown in Figure 6, the hydraulic motor of the trailer unit is driven by a hydraulic pump carried in the tractor portion, and this pump in turn is driven by a planetary type power divider. The planetary type power divider also supplies power to a transmission which in turn drives the wheels of the tractor portion. Power is delivered to the planetary type power divider from a torque converter which is connected to the tractor engine.

For a detailed description of the present invention reference is again made to the drawings wherein similar parts of the various embodiments are designated with the same numerals. Describing first those elements of the three different embodiments which are common to all of the embodiments, it may be seen that the articulated vehicle comprises a tractor portion or unit 10 and a trailer portion or unit 11. The tractor unit 10 is supported on wheels 12, the wheels 12 are carried on a front axle unit 13 which includes a differential unit of which only the ring gear 14 and pinion gear 15 are shown in Figures 3, 4 and 6. The tractor unit 10 carries an operator's compartment 16 and the engine 17, the output shaft of which is contained in the flywheel housing 18.

The trailer unit 11 is provided with a gooseneck 19 at the forward end thereof. The gooseneck 19 is pivotally mounted about a kingpin 20 which is carried in a bracket 21 mounted on the tractor unit 10. For steering of the vehicle a pair of hydraulic rams 22 are provided. The cylinders of the hydraulic rams 22 are pivotally mounted to the gooseneck 19. The piston rods of the hydraulic rams 22 are each pivotally mounted to a lever 23. The levers 23 are shaped somewhat as bellcranks. One end of each of the levers 23 is pivotally mounted on the gooseneck 19. The other ends of each of the levers 23 are pivotally mounted to links 24. The other end of each of the links 24 is pivotally mounted to the bracket 21 on the tractor unit 10. As one of the hydraulic rams 22 is extended while the other is retracted a corresponding amount, one lever 23 will be pivoted forwardly relative to the trailer unit 11 while the other is pivoted rearwardly relative to the trailer unit 11. This action will cause a force to be applied through the links 24 to the tractor unit 10 to cause a relative movement between the tractor unit 10 and the trailer unit 11 in a direction dependent upon which hydraulic ram 22 was extended and which hydraulic ram 22 was retracted.

The trailer unit 11 is supported by a pair of wheels 25. The wheels 25 are carried on the rear axle assembly 26 which includes a differential of which only the ring gear 27 and pinion gear 28 are shown in Figures 3, 4 and 6. In the present embodiments the trailer unit 11 is shown as a hopper type of unit, however any other type of body well known in the art may be substituted for this hopper unit.

The trailer units 11 of each of the embodiments shown in Figures 3, 4 and 6 are substantially the same. Although some portions of the hydraulic system appear to be shown as carried by the trailer unit 11, these hydraulic systems are merely shown diagrammatically and it is intended that they be carried in either the tractor unit 10 or the trailer unit 11 wherever each arrangement is more convenient. It is further intended that only a plurality of hydraulic fluid conduits be used to bridge the articulated connection between the tractor unit 10 and the trailer unit 11.

Figure 8:
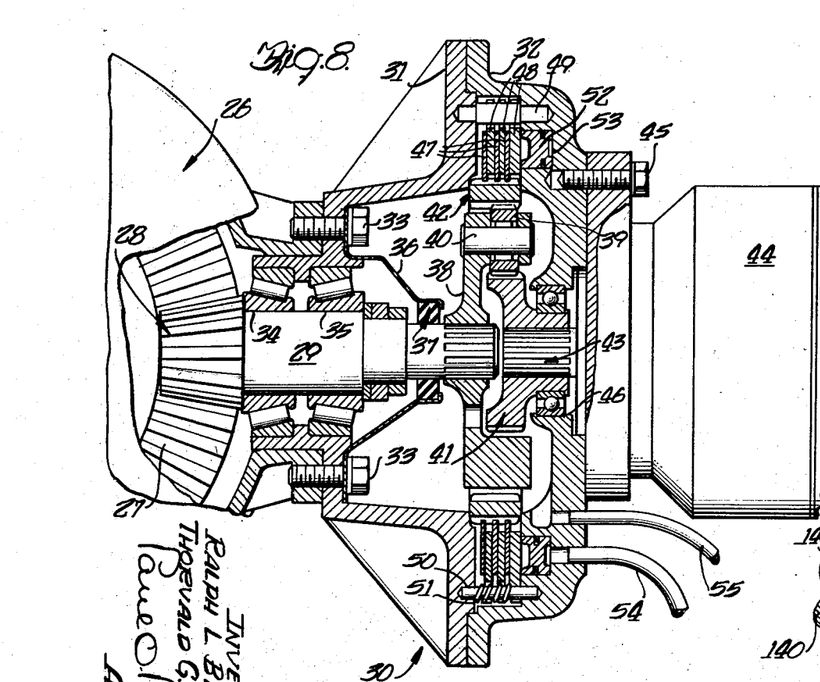
Figure 8 is an enlarged partially cross sectional view of the rear axle assembly of Figures 1 through 6.

The pinion gear 28 of the differential for each trailer unit 11 is extended by a shaft 29 into a planetary type reduction and disconnect unit 30 as shown in Figure 8. The reduction and disconnect unit 30 comprises two housing members 31 and 32 which are mounted together to the differential unit of the axle assembly 26 by means of bolts 33. The shaft 29 is rotatively supported in roller bearing sets 34 and 35 which are mounted in an opening through the housing 31. A plate member 36 including an oil seal 37 is mounted about the shaft 29 and secured within the housing 31 by the bolts 33, and serves to seal the lubricating oil in the differential unit of the axle assembly 26 from the reduction and disconnecting unit 30. The end of the shaft 29 within the unit 30 has a planet carrier 38 splined thereon. The planet carrier 38 has three planet pinion gears 39 conventionally mounted thereon by means of roller bearings and shafts 40. The planet pinion gears 39 engage a sun gear 41 and a ring gear 42. The sun gear 41 is splined on the end of shaft 43 of the hydraulic motor 44. The hydraulic motor 44 which may be of any suitable type known in the art and capable of operation in either direction is mounted over an opening in the housing 32 by means of bolts such as bolts 45 and the ball bearing set 46 mounted in that opening rotatively supports the sun gear 41 and the shaft 43.

The outer circumference of the ring gear 42 is splined to slidably receive a plurality of brake disks 47. The brake disks 47 are stacked alternately with stationary brake disks 48. The stationary brake disks 48 are slidably mounted on a plurality of bars such as bars 49 which are disposed about the periphery of the stationary disks 48 and secured between the walls of the housings 31 and 32. A plurality of rods and coiled springs such as rod 50 and coiled spring 51 are also provided about the periphery of the stationary disks 48. The rods 50 are secured between the walls of the housings 31 and 32, and the coiled springs 51 projecting between the wall of the housing 31 and the stationary disk 48 furthest therefrom bias the brake to the off position. This brake further comprises an annular piston 52 which is slidably mounted in an annular groove 53 formed in the housing 32. A hydraulic fluid line 54 mounted through the housing 32 and connected into the annular groove 53 is provided for operating the brake. Thus it may be seen that when hydraulic fluid under pressure is supplied to the annular groove 53 through hydraulic fluid conduit 54, the annular piston 52 is moved outwardly of the annular groove 53 and against the adjacent stationary brake disk 48. Further movement of the annular piston 52 compresses the rotating brake disks 47 and the stationary brake disks 48 together against one wall of the housing 31 to brake the ring gear 42. When hydraulic fluid under pressure is vented from conduit 54, the coiled springs 51 will return the annular piston 52 to the unoperated position and the ring gear 42 will be free to rotate. A fluid conduit 55 is connected through one wall of the housing 32 and then its connection with the main transmission unit serves to maintain a suitable lubricant-oil level in the planetary unit. When high pressure hydraulic fluid is delivered to the hydraulic motor 44, the shaft 43 and the sun gear 41 will be caused to rotate. If the ring gear 42 is braked, the planet pinion gears 39 will be caused to planetate about the inner circumference of the ring gear 42. This will cause a rotation of the planet carrier 38 at a speed reduced from that of the shaft 43. The rotating planet carrier 38 will rotate shaft 29 which will in turn rotate the differential pinion gear 28 to in turn cause a rotation of the wheels 25 of the trailer unit 11. If the ring gear 42 is not braked, any rotation of the sun gear 41 by the hydraulic motor 44 will cause the ring gear 42 to idle and thus there is no relationship between the speed of the sun gear 41 and pinion gear 28.

Turning next to a detailed description of the embodiment of the present invention shown in Figure 3, the output shaft 60 from the flywheel housing 18 of the engine 17 is connected to a power take-off assembly 61. The power take-off assembly includes a gear 62 keyed to the shaft 60 and engaging another gear 63. A torque converter 64 of any suitable type known in the art is mounted on the assembly 61 and has the input member (not shown) thereof keyed to the shaft 60. The gear 63 is keyed to the shaft of a hydraulic pump 65 which is also mounted to the assembly 61. The output shaft 66 of the torque converter 64 is connected into a transmission 67 which may be of any suitable type known in the art. The output shaft of the transmission 67 is connected to drive the wheels 12 of the tractor unit 10. The outlet of the hydraulic pump 65 is connected to hydraulic fluid conduit 68. The inlet to the hydraulic pump 65 is connected to hydraulic fluid conduit 69. The other end of conduit 68 is connected to valve 70 and the other end of conduit 69 is connected into the hydraulic fluid reservoir 71. Hydraulic fluid conduits 72 and 73 are connected between the valve 70 and the reservoir 71. Hydraulic fluid conduit 74 is connected between the hydraulic valve 70 and the hydraulic fluid reversing valve 75. The reversing valve 75 is also connected to the reservoir 71 through conduit 76. Pressure relief valve 77 is connected between conduits 73 and 74. One side of the hydraulic motor 44 is connected to the reversing valve 75 through hydraulic fluid conduit 78. The other side of the hydraulic motor 44 is also connected to the reversing valve 75 through conduit 79.

The hydraulic fluid conduit 54 for operating the brake for the ring gear 42 in the reduction and disconnect unit 30 is connected to hydraulic valve 80. Hydraulic conduits 81 and 82 are both connected between the valve 80 and the transmission 67.

Describing next the operation of the embodiment of the present invention shown in Figure 3, hydraulic fluid under pressure suitable for operating the brake in the reduction and disconnect unit 30 is delivered to the valve 80 through the conduit 81 by any suitable means in the transmission 67. This valve 80 when in the four wheel drive position, delivers hydraulic fluid under pressure to conduit 54 to energize the brake for the ring gear 42 in the reduction and disconnect unit 30. When valve 80 is in the two wheel drive position, the hydraulic fluid in conduit 54 is vented through conduit 82 to the transmission 67.

When valve 70 is in the four wheel drive position, the high pressure hydraulic fluid delivered through conduit 68 from the outlet of the hydraulic pump 65, is then directed through conduit 74, through the reversing valve 75, through conduit 78, the hydraulic motor 44, conduit 79, the reversing valve 75, conduit 76, reservoir 71, and conduit 69 to the inlet of the hydraulic pump 65. In the two wheel drive position of the hydraulic valve 70, the hydraulic fluid flowing from the outlet of the pump 65 through conduit 68, will flow through the hydraulic valve 70 and through conduit 72 to the reservoir 71, and hydraulic fluid will be drawn from the reservoir 71 through conduit 69, to the inlet of the pump 65. Further, in this position of the valve 70, the conduit 74 is blocked from any hydraulic fluid communication with conduit 73.

The reversing valve 75 has two operated positions, one wherein conduit 74 is connected through the valve 75 to conduit 78 and conduit 76 is connected through the valve 75 to conduit 79, and the other position wherein conduit 74 is connected through the valve 75 to conduit 79 and conduit 76 is connected through the valve 75 to conduit 78. The operation of the reversing valve 75 is coordinated with the transmission 67 so that the driving direction of the hydraulic motor 44 for the wheels 25 corresponds to the driving direction of the transmission 67 for the wheels 12. The pressure relief valve 77 which is connected between conduits 73 and 74 is adjustable, and is set to open and permit hydraulic fluid to flow from conduit 74 through conduit 73 to the reservoir 71 at hydraulic fluid pressures above that determined as a safe operating limit for the hydraulic system. All of the valves 70, 80, 77 and 75 and the reservoir 71 are mounted in the tractor unit 10 with the conduits 78, 79 and 54 extending between the tractor unit 10 and the trailer unit 11.

With the engine 17 operating, the power delivered by the shaft 60 will operate both the hydraulic pump 65 and the torque converter 64. For operation of the unit through the wheels 12 only, the valves 70 and 80 are placed in their two-wheel-drive positions, and the operator of the vehicle by suitable operations of the transmission 67 may cause the drive to be extended from the torque converter 64 through shaft 66, the transmission 67, and the front axle to the wheels 12 of the tractor unit 10. The pump 65 is now merely circulating hydraulic oil under no pressure. With the conduit 74 blocked at valve 70 and the brake for ring gear 42 disengaged the hydraulic motor 44 will remain stationary. The rotation of the wheels 25 caused by movement of the vehicle will cause a rotation of the shaft 29 in the reduction and disconnect unit 30, and this rotation of the shaft 29 will cause the planet pinion gears 39 to planetate about the sun gear 41 which in turn will cause the ring gear 42 to idle.

If the operator of the vehicle desires to receive a braking effect from the trailer unit 11, he may operate the valve 80 to energize the brake in the reduction and disconnect unit 30, leaving the valve 70 in the unoperated position. The operation of the brake will cause the ring gear 42 to be stopped and as the planet carrier 38 continues to rotate due to the rotation of the wheels 25, the sun gear 41 will be driven by the planet pinion gears 39 to in turn cause a rotation of the hydraulic motor 44. The hydraulic motor 44 will then act as a hydraulic pump and will deliver high pressure hydraulic fluid through either conduit 78 or 79 dependent upon the direction of movement of the vehicle and the operated position of the reversing valve 75, to conduit 74. Since hydraulic valve 70 is not operated and consequently conduit 74 is blocked at the valve 70, the high pressure hydraulic fluid will work against pressure relief valve 77 to discharge hydraulic fluid into the reservoir 71 through conduit 73 thereby achieving a certain amount of braking effect of the wheels 25 dependent upon the pressure setting of the pressure relief valve 77.

To produce four wheel drive, the operator of the vehicle will operate both hydraulic valves 70 and 80. With hydraulic valve 80 in four-wheel drive position, the ring gear 42 in the reduction and disconnect unit 30 will be braked, and with hydraulic valve 70 in four wheel drive position, hydraulic fluid will be delivered to the hydraulic motor 44 through either conduit 78 or conduit 79 dependent upon the position of the reversing valve 75. It should be noted that the positioning of the reversing valve should be synchronized to the directional control-lever of the transmission 67 to at all times insure operation of the wheels 12 and 25 in the same direction. The hydraulic motor 44 will then operate to rotate the sun gear 41 of the reduction and disconnect unit 30, which will in turn drive the planet carrier 38 through the planet pinion gears 39 at a reduced speed from that of the sun gear 41. The rotating planet carrier 38 will drive the wheels 25 of the trailer unit 11. It should be noted that the reduction and disconnect unit 30, permits the use of a hydraulic motor 44 of the relatively light and high speed type, since the reduction and disconnect unit 30 in reducing speed thereacross will multiply the torque to the wheels 25.

Figures 5, 7:
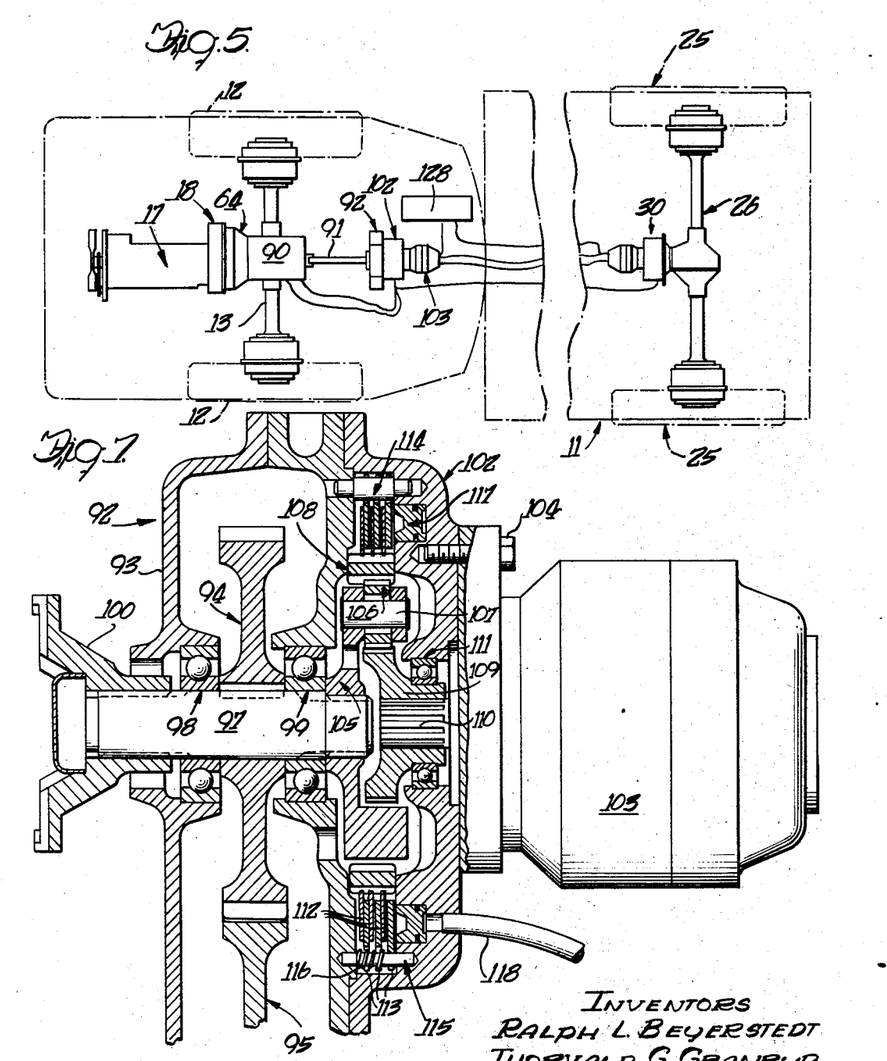
Figure 5 is a top plan view of the vehicle shown in Figure 4 with portions thereof removed to show the extensions of the power train from the engine to both the forward and rearward wheels.
Figure 7 is an enlarged partially cross sectional view of the transfer drive mechanism and planetary reduction unit in the tractor portion of the vehicle of Figure 4.

Turning next to a description of the second embodiment of the present invention, that shown in Figure 4, reference is made thereto. In this embodiment the torque converter 64 is mounted on the flywheel housing 18 and directly connected to the drive shaft. A transmission 90 of any suitable type well known in the art is mounted adjacent the torque converter 64 and operatively connected thereto. The output shaft 91 of the transmission 90 is connected into the transfer drive unit or assembly 92 of which the upper portion is shown in Figure 7. The transfer drive assembly 92 comprises a housing 93 and three spur gears 94, 95 and 96 disposed in a vertical alignment and rotatively mounted in the housing 93. Gears 95 and 96 are mounted similarly to gear 94 as shown in Figure 7. Gear 94 is keyed on a shaft 97, and the shaft 97 is rotatively mounted through the transfer drive housing 93 by means of the two ball bearing sets 98 and 99. One end of the shaft 97 extending outwardly of the housing 93 provided with a flange 100 for providing a universal connection between the shaft 97 and the output shaft 91 from the transmission 90. Gear 95 which functions as an idler gear is mounted to mesh with gears 94 and 96. Gear 96 is keyed to a shaft 101, which shaft extends from the transfer drive assembly 92 and is drivingly connected to the differential pinion gear 15 of the axle assembly 13 of the tractor unit 10.

A step-up and disconnect unit 102 is mounted on the transfer drive assembly 92 over the end of the shaft 97 extending therefrom. A hydraulic pump 103 is mounted on the step-up and disconnect unit 102 by a number of bolts such as bolt 104. The step-up and disconnect unit 102 and the hydraulic pump 103 are similar to and are of the same size and capacity as the reduction and disconnect unit 30 and the hydraulic motor 44. As shown in Figure 7, the step-up and disconnect unit 102 comprises a planetary set with a brake for the ring gear thereof. The planet carrier 105 is keyed to the shaft 97. A plurality of planet pinion gears 106 are rotatively carried by shafts 107, which are carried by the planet carrier 105. The planet pinion gears 106 engage a ring gear 108. The planet pinion gears 106 also mesh with the sun gear 109. The sun gear 109 is splined on the shaft 110 of the pump 103, and the sun gear 109 is rotatively mounted through the housing of the step-up and disconnect unit 102 by means of the ball bearing set 111. The outer circumference of the ring gear 108 is provided with a plurality of teeth which engage a plurality of rotating brake disks 112 for sliding movement of the disks 112 axially of the ring gear 108. The rotating brake disks 112 are part of the brake assembly for the ring gear 108, which brake assembly further comprises a plurality of stationary brake disks 113. The stationary brake disks 113 are positioned in a side by side alternating arrangement with the rotating brake disks 112. The stationary brake disks 113 are prevented from any rotative movement while permitted sliding movement by a plurality of rods such as rod 114. The rods 114 are secured in opposite walls of the housing of the step-up and disconnect unit 102. The stationary brake disks 113 are also provided about their periphery with a number of rods 115 and coiled springs 116. The coiled springs 116 which are mounted upon the rods 115 abut one wall of the housing of the unit 102 and the stationary brake disk furthest therefrom to bias the brake assembly for the ring gear 108 to the off position. The brake assembly for the ring gear 108 further comprises an annular piston 117 which is slidably mounted in an annular groove formed in one wall of the housing of the unit 102. A hydraulic line 118 is connected through the unit 102 into the annular groove carrying the annular piston 117 whereby the application of hydraulic fluid under pressure to conduit 118 will cause the annular piston 117 to be moved outwardly of the annular groove and against the stationary brake disks 113 and the rotating brake disks 112 to compress these disks together against the opposite wall of the housing of the unit 102 to cause the ring gear 108 to be braked.

The hydraulic pump 103, which is of the type that can operate in either direction to deliver hydraulic fluid through either conduit 120 or 121 dependent upon the direction of rotation of the pump 103, is connected through conduits 120 and 121 to four check valves 122, 123, 124 and 125. From conduit 120 fluid may flow through check valve 125 but not through check valve 124. From conduit 121 hydraulic fluid may flow through check valve 122 but not through check valve 123. Check valve 122 is connected through conduit 126 to one side of the hydraulic motor 44. Check valves 123 and 124 are together connected by means of conduit 127 to the hydraulic fluid reservoir 128. Check valve 125 is connected through conduit 129 to the other side of the hydraulic motor 44. A shuttle valve 137 and two pressure relief valves 131 and 132 are also provided. The shuttle valve 137 is connected to conduits 126, 129, and 130. Conduit 130 is also connected into the hydraulic fluid reservoir 128. A pressure relief valve 131 is connected between conduits 129 and 130. A pressure relief valve 132 is connected between conduits 126 and 130.

Hydraulic valve 133 which is provided for operation of the brakes for the ring gears in the units 30 and 102 is connected to conduits 118, 134 and 135. Conduit 54 from the reduction and disconnect unit 30 is connected into conduit 118. Conduit 134 is connected to the transmission 90 and the transmission 90 serves to supply hydraulic fluid under pressure to the hydraulic valve 133 for operation of the brakes in the units 30 and 102. Conduit 135 is also connected into the transmission 90 and serves to vent hydraulic fluid from hydraulic valve 133. The remaining elements of the second embodiment not specifically described are the same as those of the first embodiment previously described. Although the hydraulic system shown in Figure 4 is distributed over both the tractor unit 10 and the trailer unit 11 in the diagrammatic arrangement shown therein, it is intended that substantially all of the system be carried by the tractor unit 10 with conduits 126, 130, 129 and 54 extending between the tractor unit 10 and the trailer unit 11.

Turning next to a detailed description of the operation of the second embodiment, it may be seen that the power train from the engine extends through the torque converter 64 and the transmission 90 to the output shaft 91. Therefore the output shaft 91 will be rotated at the speeds and direction selected by operation of the transmission 90 by the operator of the vehicle. Assuming that the transmission 90 is operated at certain speeds for the forward direction of the vehicle, and assuming that the valve 133 is not operated, the output shaft 91 will rotate gear 94, which will in turn rotate gear 95, to in turn rotate gear 96, which will deliver power to the wheels 12 of the tractor 10 through shaft 101. Since the valve 133 is not operated, the brakes for the ring gears in the step-up and disconnect unit 102 and the reduction and disconnect unit 30 will not be operated. The ring gears will thus be free to rotate and the planet pinion gears will merely revolve around their respective sun gears. Thus the pump 103 and the hydraulic motor 44 will remain stationary.

Assuming next that the transmission is operated to a position for certain speeds in the forward direction and that the valve 133 is operated for four wheel drive, the power train from the shaft 91 to the wheels 12 remains the same. With the valve 133 operated, the ring gears 108 and 42 in the step-up and disconnect unit 102 and the reduction and disconnect unit 30 respectively will be braked against any rotation. The rotation of shaft 97 rotating in the direction and at the speed for the selected transmission position will rotate the planet carrier 105. The planet pinion gears 106 will then revolve about the ring gear 108 driving the sun gear 109 at an increased speed. The rotating sun gear 109 will, through the shaft 110, operate the hydraulic pump 103 to deliver hydraulic fluid under pressure through either conduit 120 or 121. Assuming that for the forward direction the pump 103 is rotated in a direction to cause hydraulic fluid to flow from the pump through conduit 121, and from conduit 120 into the pump 103. From conduit 121 the hydraulic fluid will flow through check valve 122, conduit 126, into the side of the hydraulic motor 44 connected thereto, and from the other side of the hydraulic motor 44 through the shuttle valve 137, through conduit 130 to the reservoir 128. From the reservoir 128 hydraulic fluid will be supplied to the pump 103 through conduit 127 and check valve 124. This flow through the hydraulic motor 44 will cause a rotation of the wheels 25 of the trailer unit 11 in the forward direction. The hydraulic fluid under pressure in conduit 126 will enter the portion of the shuttle valve 137 connected thereto and seat the spool against any fluid flow from conduit 126 to conduit 130. With the seating of the valve spool in the one portion of the shuttle valve 137, the part of the valve spool in the other portion of the shuttle valve 137, connected to conduit 129, is opened to permit the described flow from the hydraulic motor 44 through conduit 130. Check valve 125 prevents any fluid flow from conduit 129 through conduit 120. Should the hydraulic fluid under pressure develop pressures higher than the setting of the pressure relief valve 132, that valve will open to bypass hydraulic fluid from conduit 126 through conduit 130 to the reservoir 128. It should further be noted that the step-up and disconnect unit 102 and the reduction and disconnect unit 30 are of the same size and the hydraulic pump 103 and the hydraulic motor 44 are of the same displacement, with all of these units being of a size and displacement to provide for a matching of the power delivered to the wheels 25 of the trailer unit 11 with that delivered to the wheels 12 of the tractor unit 10.

Assuming next that the transmission is operated for some speed in the reverse direction and that the valve 133 is again operated for four wheel drive in the reverse direction, the shaft 91 will now rotate in a direction opposite from that described above. Since the shaft 91 is rotating in a direction for reverse movement of the vehicle, the extension of the power train from shaft 91 to the wheels 12 is reversed to provide for a reverse rotation of the wheels 12 of the tractor unit 10 and since the hydraulic valve 133 is operated energizing the brakes in the units 102 and 30, the planet carrier 105 in the step-up and disconnect unit 102 will rotate in a reverse direction to reverse the rotation of the hydraulic pump 103. With the reverse rotation of the hydraulic pump 103, hydraulic fluid will flow out of the pump 103 through conduit 120 and hydraulic fluid will flow into the pump 103 from conduit 121. From conduit 120 the hydraulic fluid will now flow through check valve 125, conduit 129, to the side of the hydraulic motor 44 connected thereto, through the hydraulic motor 44, through the portion of the shuttle valve 137 connected on that side of the motor 44, and through conduit 130 to the reservoir 128. From the reservoir 128 hydraulic fluid will be delivered to the pump 103 through conduit 127 and check valve 123. Thus it may be seen that the hydraulic motor 44 is rotated in a reverse direction from that previously described to thereby cause the wheels 25 of the trailer unit 11 to rotate in a reverse direction. With hydraulic fluid under pressure in conduit 129, the valve spool in that portion of the shuttle valve 137 connected thereto will be seated to prevent any fluid flow from conduit 129 directly to conduit 130. While the portion of the valve spool of the shuttle valve 137 connected to conduit 126 will be opened to permit free fluid flow from conduit 126 to conduit 130. Should the pressure in conduit 129 rise above that pressure for which the pressure relief valve 131 is set, the pressure relief valve 131 will open to pass hydraulic fluid from conduit 129 directly through conduit 130 to the reservoir 128. It should be noted that with the arrangement shown in Figure 4 no reversing valve such as shown in the embodiment of Figure 3 is necessary. Further, with the arrangement of Figure 4 the four wheel drive valve 70 of the embodiment of Figure 3 is not necessary.

The embodiment of the present invention shown in Figure 4 will also provide vehicle braking with the wheels 25 of the trailer unit 11. With the valve 133 operated so that the brakes for the ring gears in the units 30 and 102 are operated, the hydraulic motor 44 will function as a hydraulic pump operated by the wheels 25 of the trailer unit 11 through the reduction and disconnect unit 30 to deliver hydraulic fluid through either conduit 126 against the pressure setting of the pressure relief valve 132 or through conduit 129 and against the setting of the pressure relief valve 131, dependent upon the direction that the vehicle is traveling.

Figure 9:
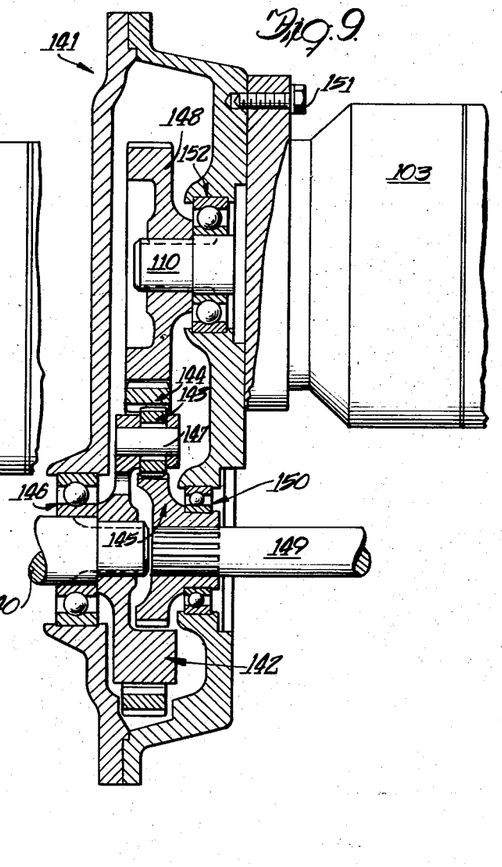
Figure 9 is an enlarged partially cross-sectional view of the planetary power divider distributing the engine power to the hydraulic driving system and the mechanical driving system of the vehicle of Figure 6.

Turning next to a detailed description of the third embodiment of the present invention reference is particularly made to Figures 6 and 9. As in the embodiment of Figure 4, the output of the engine 17 at the flywheel housing 18 is connected to a torque converter 64 mounted on the flywheel housing 18. The output of the torque converter 64 is delivered through shaft 140 to the power divider assembly 141. The power divider assembly 141 comprises a housing within which a planetary set is operatively mounted. The planetary set comprises a planet carrier 142, a plurality of planet pinion gears such as gear 143, a ring gear 144 and a sun gear 145. The planet carrier 142 is keyed to the end of the shaft 140 extending from the torque converter 64. The shaft 140 is rotatively mounted through the housing of the power divider assembly 141 by means of the ball bearing set 146. The planet carrier 142 carries a plurality of shafts 147 upon which the planet pinion gears 143 are rotatively mounted. The planet pinion gears 143 mesh with the ring gear 144, and the outer periphery of the ring gear 144 is provided with a plurality of gear teeth meshing with a spur gear 148. The planet pinion gears 143 also mesh with the sun gear 145 which is splined upon a shaft 149. The sun gear 145 and the shaft 149 are rotatively mounted in an opening through the housing of the power divider 141 by means of the ball bearing set 150. The output shaft 149 from the power divider assembly 141 is operatively connected into the transmission 67 and from the transmission 67 a mechanical power train is extended to the wheels 12 of the tractor unit 10 through the differential pinion gear 15. Thus it may be noted that whenever shaft 149 is rotated by the sun gear 145 power is delivered to the transmission 67 for rotation of the wheels 12 of the tractor unit 10.

The spur gear 148 which meshes with the teeth on the outer circumference of the ring gear 144 is keyed to the shaft 110 for operating the hydraulic pump 103. The hydraulic pump 103 is mounted on the housing of the power divider 141 by means of a plurality of bolts such as bolt 151. The shaft 110 of the pump 103 is rotatively supported in an opening in the housing of the power divider 141 by means of the ball bearing set 152. Thus it may be seen that when the ring gear 144 is rotated, the spur gear 148 is caused to rotate to operate the hydraulic pump 103.

The remainder of the embodiment shown in Figure 6 is substantially similar to that of Figure 3. The output side of the pump 103 is connected to conduit 68 which in turn is connected to a four wheel drive valve 155. The four wheel drive valve 155 differs from the four wheel drive valve 70 of the first embodiment in that the valve 155 blocks conduit 68 when valve 155 is in the unoperated position rather than permitting free fluid flow between conduits 68 and 72 as is the case with valve 70. A pressure relief valve 153 is provided between conduit 68 and the hydraulic fluid reservoir 71 and is set to provide hydraulic fluid flow therethrough to the reservoir 71 whenever the fluid pressure in conduit 68 rises above a predetermined safe maximum. The inlet of the hydraulic pump 103 is connected by conduit 69 to the reservoir 71. Conduits 72 and 73 are provided between the four wheel drive valve 155 and the reservoir 71. Conduit 74 is connected between the four wheel drive valve 155 and the reversing valve 75. Another pressure relief valve 77 is connected between conduit 74 and conduit 73 to provide for free fluid flow from conduit 74 to the reservoir 71 if at any time the fluid pressure in conduit 74 rises above a predetermined safe maximum. Conduit 76 is connected between the reservoir 71 and the reversing valve 75. Conduits 78 and 79 are connected from the reversing valve 75 to the hydraulic motor 44. The hydraulic motor 44 is connected to drive the reduction and disconnect unit 30 which in turn is operatively connected to drive the wheels 25 of the trailer unit 11 through the differential pinion gear 28 and the trailer unit axle assembly. As previously described the reduction and disconnect unit 30 includes a brake for the ring gear 42 so that when the brake is energized any rotation of the hydraulic motor 44 causes the rotation of the wheels 25 and when the brake is off the wheels 25 are freely rotatable. This brake in the reduction and the disconnect unit 30 is operated through conduit 54 connected between the unit 30 and the valve 80. Valve 80 is selectively operable to either deliver hydraulic fluid under pressure from the transmission 67 through conduit 81 and 54 or to vent any hydraulic fluid under pressure from conduit 54 through conduit 82 to suitable sump (not shown) in the transmission 67.

Turning next to a description of the operation of the embodiment shown in Figure 6, and assuming that the vehicle is to be driven through the wheels 12 of the tractor unit 10, the valve 80 is not operated so that the brake in the reduction disconnect unit 30 is off, and the four wheel drive valve 70 is also not operated so that conduit 68 is blocked. With the brake in the reduction disconnect unit 30 off, the wheels 25 of the trailer unit 11 are freely rotatable. With the conduit 68 blocked, the outlet from the hydraulic pump 103 is blocked so that hydraulic fluid may not flow therefrom except through the pressure relief valve 153. With the outlet of the pump 103 blocked, the pump will remain substantially stationary. With the pump 103 stationary, the spur gear 148 will be stationary holding the ring gear 144 against rotation. The power delivered from the engine 17 to shaft 140 will then drive the planet carrier 142. The planet carrier 142 will carry the planet pinion gears 143 about the inner teeth of the stationary ring gear 144 and these planet pinion gears 143 in revolving will drive the sun gear 145 and the shaft 149. The shaft 149 will deliver the engine power to the transmission 67, and dependent upon its operated positions of direction and speed, the wheels 12 of the tractor unit 10 will be correspondingly driven.

For four wheel drive of the vehicle, it is necessary that the operator of the vehicle operate valve 80 so that hydraulic fluid is delivered through conduit 54 to energize or operate the brake in the reduction and disconnect unit 30 and to operate the four-wheel drive valve 155 so that hydraulic fluid from conduit 68 is delivered through conduit 74 to the reversing valve 75. Dependent upon the operation of the reversing valve 75 which is coordinated with the operation of the transmission 67 by any suitable means (not shown) the hydraulic fluid under pressure will be delivered to either conduit 78 or 79 to the hydraulic motor 44 and return through the other conduit to the reversing valve 75, and therefrom through conduit 76 to the reservoir 71. Since the brake in the reduction and disconnect unit 30 is on, the hydraulic motor 44 will drive the wheels 25 of the trailer unit 11. With the four wheel drive valve 155 operated so that hydraulic fluid passes therethrough from conduit 68, the pump 103 will be operated by the rotation of the spur gear 148, which in turn will be rotated by the ring gear 144. With the engine power being delivered in two paths through the shaft 149 and the spur gear 148 from the planetary set in the power divider 141, the torque applied to the spur gear 148 will be dependent upon the torque reaction supplied by the sun gear 145 and the torque supplied to the shaft 149 will be dependent upon the torque reaction supplied by the spur gear 148.

With the above described arrangement, for a given input torque on carrier 142 the tractive effort, applied at the wheels 12, will remain the same in two and four wheel drive. However, since power is delivered through the ring gear 143 in four-wheel drive it follows that the speed of rotation of sun gear 145 is decreased as compared to that in two-wheel drive. Thus it follows that the effect of the combined tractive effort on wheels 12 and wheels 25 in four-wheel drive is accompanied by a corresponding decrease in vehicle speed as compared to that in two-wheel drive.

Additional braking effect may be achieved with the third embodiment in a manner similar to that described previously for the other embodiments of the present invention. For braking effect with the wheels 25, the four-wheel drive valve 155 is left in the two-wheel drive or unoperated position wherein the pump 103 is blocked and conduit 74 is blocked, and the hydraulic valve 80 is operated to energize the brake in the reduction and disconnect unit 30. Under this condition, the wheels 25 will rotate the hydraulic motor 44 which will then act as a pump delivering hydraulic fluid through either conduit 78 or 79 dependent upon the direction of motion of the vehicle, through valve 75, and to the reservoir 71 against the pressure setting of the pressure relief valve 77.

As in the previous embodiment it is intended that the hydraulic valves and the major portion of the hydraulic system for the vehicle be carried by the tractor unit 10 with only the conduits 54, 78 and 79 extending between the two units 10 and 11.

Having described the invention what is considered new and desired to be protected by Letters Patent is:

1. In a vehicle, a tractor unit supported by traction means, a trailer unit supported by traction means, means connecting said units for pivotal movement therebetween, steering means mounted between said units for selectively pivoting one of said units relative to the other about a vertical axis, an engine carried by said tractor unit, a mechanical power train connected between said engine and said traction means of said tractor unit for driving said traction means thereof, a hydraulic pump carried by said tractor unit and operatively connected to said engine, a hydraulic motor carried by said trailer unit, hydraulic conduit means interconnecting said hydraulic motor and said hydraulic pump for operation of said hydraulic motor, gearing means comprising a planetary set of three members, said hydraulic motor connected to drive one of said members of said planetary set, the second of said three members connected to drive the traction means for said trailer unit, and a selectively operable brake for the third member of said three members of said planetary set.

2. In a vehicle, a tractor unit supported by traction means, a trailer unit supported by traction means, means connecting said units for pivotal movement therebetween, steering means mounted between said units for selectively pivoting one of said units relative to the other about a vertical axis, an engine carried by said tractor unit, a mechanical power train connected between said engine and said traction means of said tractor unit for driving said traction means thereof, a hydraulic pump carried by said tractor unit and operatively connected to said engine, a hydraulic motor carried by said trailer unit, hydraulic conduit means connecting said hydraulic pump and said hydraulic motor so that said motor is driven by said pump, gearing means comprising a planetary set comprising a sun gear, a planet carrier rotatively carrying a plurality of planet pinion gears and an orbit gear, means connecting said hydraulic motor to drive said sun gear, means connecting said planet carrier to drive said traction means for said trailer, and a selectively operable brake for said orbit gear, so that upon operation of said brake said planet carrier is driven at a lower speed than said sun gear and so that when said brake is off said planet carrier is free to rotate relative to said sun gear.

3. In a vehicle, a tractor unit supported by traction means, a trailer unit supported by traction means, means connecting said units for pivotal movement therebetween, steering means mounted between said units for selectively pivoting one of said units relative to the other about a vertical axis, an engine carried by said tractor unit, a mechanical power train connected between said engine and said traction means of said tractor unit for driving said traction means thereof, a hydraulic pump carried by said tractor unit and operatively connected to said engine, a hydraulic fluid conduit means connected between said hydraulic pump and said hydraulic motor for operation of said hydraulic motor by said hydraulic pump, planetary type gearing means comprising an input shaft and an output shaft, said gearing means including a hydraulically operated brake so that upon operation of said brake said input shaft is connected to drive said output shaft at a lower speed than said input shaft and so that when said brake is off said output shaft is free to rotate relative to said input shaft, a source of hydraulic fluid connected to a manually operable hydraulic valve carried by said tractor unit and connected to said hydraulic brake for operation thereof, said input shaft connected to be driven by said hydraulic motor and said output shaft connected to drive said traction means for said trailer unit.

4. In a vehicle as claimed in claim 3, a pressure relief valve, and said hydraulic fluid conduit means including means for disconnecting said hydraulic pump from said hydraulic motor and for connecting said pressure relief valve across said hydraulic motor so that when said hydraulic valve is operated to operate said brake, said hydraulic motor will be driven by said traction means to operate as a pump against said pressure relief valve and thereby provide vehicle braking with the traction means of said trailer unit.

5. In a vehicle, a tractor unit supported by traction means, a trailer unit supported by traction means, means connecting said units for pivotal movement therebetween, steering means mounted between said units for selectively pivoting one of said units relative to the other about a vertical axis, an engine carried by said tractor unit, a mechanical power train connected between said engine and said traction means of said tractor unit and selectively operable to drive said traction means thereof in forward or reverse directions, a hydraulic pump carried by said tractor unit and operatively connected to said engine, a hydraulic motor carried by said trailer unit, hydraulic fluid conduit means connecting said hydraulic motor to said hydraulic pump for operation of said hydraulic motor by said hydraulic pump, planetary type gearing means comprising an input shaft and an output shaft, said gearing means including a hydraulically operated brake so that upon operation of said brake said input shaft is connected to drive said output shaft at a lower speed than said input shaft and so that when said brake is off said input shaft is free to rotate relative to said output shaft, said input shaft connected to drive said hydraulic motor and said output shaft connected to drive said traction means for said trailer unit, said hydraulic fluid conduit means including means for directing hydraulic fluid to drive said hydraulic motor in a direction whereby said traction means for said trailer unit are driven in a direction corresponding to the direction in which said mechanical power train drives said traction means for said tractor, and a source of hydraulic fluid pressure connected to a manually operable hydraulic valve, said hydraulic valve connected to said hydraulic brake for operating said hydraulic brake.

6. In a vehicle as claimed in claim 5, a pressure relief valve and wherein said hydraulic fluid conduit means includes means for disconnecting said hydraulic pump from said hydraulic motor and for connecting said pressure relief valve across said means for directing hydraulic fluid to said hydraulic motor whereby said hydraulic motor will operate as a hydraulic pump against said pressure relief valve to provide vehicle braking with said traction means for said trailer unit in either direction of travel of said vehicle when said hydraulic valve is operated to operate said hydraulic brake.

7. In a vehicle, a tractor unit supported by traction means, a trailer unit supported by traction means, means connecting said units for pivotal movement therebetween, steering means mounted between said units for selectively pivoting one of said units relative to the other about a vertical axis, an engine carried by said tractor unit, a power take-off assembly comprising an input shaft and two output shafts, said input shaft connected to be driven by said engine, a hydraulic pump, a mechanical power train connected to drive the traction means of said tractor unit, said hydraulic pump connected to be driven by one of said output shafts and said mechanical power train connected to be driven by the other output shaft of said power take-off assembly, a hydraulic motor carried by said trailer unit, hydraulic fluid conduit means connected between said hydraulic pump and said hydraulic motor for operation of said hydraulic motor by said hydraulic pump, planetary type gearing means comprising an input shaft and an output shaft, said gearing means including a brake so that upon operation of said brake said input shaft is connected to drive said output shaft at a lower speed than said input shaft and so that when said brake is off said output shaft is free to rotate relative to said input shaft, said input shaft of said gearing means connected to be driven by said hydraulic motor and said output shaft of said gearing means connected to drive said traction means for said trailer unit.

8. In a vehicle, a tractor unit supported by traction means, a trailer unit supported by traction means, means connecting said units for pivotal movement therebetween, steering means mounted between said units for selectively pivoting one of said units relative to the other about a vertical axis, an engine carried by said tractor unit, a power take-off assembly comprising an input shaft and two output shafts, said input shaft connected to be driven by said engine, a hydraulic pump, a mechanical power train including a selectively operable transmission connected to drive the traction means of said tractor unit, said hydraulic pump connected to be driven by one of said output shafts and said mechanical power train connected to be driven by the other output shaft of said power take-off assembly, a hydraulic motor carried by said trailer unit, hydraulic fluid conduit means connected between said hydraulic pump and said hydraulic motor, said hydraulic fluid conduit means including valving means for selectively directing hydraulic fluid between said hydraulic motor and said hydraulic pump for operation of said hydraulic motor by said hydraulic pump in either direction and for disconnecting any hydraulic fluid flow between said hydraulic pump and said hydraulic motor, and means connecting said hydraulic motor to drive said traction means for said trailer unit.

9. In a vehicle as claimed in claim 8 wherein said means connecting said hydraulic motor to drive said traction means for said trailer unit comprises a planetary set of three members, said hydraulic motor connected to drive one of said members of said planetary set, the second of said three members connected to drive said traction means for said trailer unit, and a selectively operable brake for the third member of said three members of said planetary set.

10. In a vehicle, a tractor unit supported by traction means, a trailer unit supported by traction means, means connecting said units for pivotal movement therebetween, steering means mounted between said units for selectively pivoting one of said units relative to the other about a vertical axis, an engine carried by said tractor unit, a transmission connected to be driven by said engine and having an output shaft and selectively operable to rotate said output shaft at different speeds and in different directions, a transfer drive assembly comprising an input shaft and two output shafts, said input shaft connected to said output shaft of said transmisison, means connecting one of said output shafts of said transfer drive unit to drive said traction means for said tractor unit, a hydraulic pump, means connecting said hydraulic pump to the other output shaft of said transfer drive assembly for operation of said hydraulic pump, a hydraulic motor carried by said trailer unit, means connecting said hydraulic motor to drive said traction means for said trailer unit, and hydraulic fluid conduit means connected between said hydraulic pump and said hydraulic motor for operation of said hydraulic motor by said hydraulic pump.

11. In a vehicle, a tractor unit supported by traction means, a trailer unit supported by traction means, means connecting said units for pivotal movement therebetween, steering means mounted between said units for selectively pivoting one of said units relative to the other about a vertical axis, an engine carried by said tractor unit, a transmission connected to be driven by said engine and having a output shaft and selectively operable to rotate said output shaft at different speeds and in different directions, a transfer drive assembly comprising an input shaft and two output shafts, said input shaft connected to said output shaft of said transmission, means connecting one of said output shafts of said transfer drive unit to drive said traction means for said tractor unit, a hydraulic pump, means connecting said hydraulic pump to the other output shaft of said transfer drive assembly for operation of said hydraulic pump, a hydraulic motor carried by said trailer unit, hydraulic fluid conduit means connected between said hydraulic pump and said hydraulic motor for operation of said hydraulic motor by said hydraulic pump, gearing means comprising an input shaft and an output shaft, said gearing means including a brake so that upon operation of said brake said input shaft is connected to drive said output shaft at a lower speed than said input shaft and so that when said brake is off said output shaft is free to rotate relative to said input shaft, said input shaft of said gearing means connected to be driven by said hydraulic motor and said output shaft of said gearing means connected to drive said traction means for said trailer unit.

12. In a vehicle, a tractor unit supported by traction means, a trailer unit supported by traction means, means connecting said units for pivotal movement therebetween, steering means mounted between said units for selectively pivoting one of said units relative to the other about a vertical axis, an engine carried by said tractor unit, a transmission connected to be driven by said engine and having an output shaft and selectively operable to rotate said output shaft at different speeds and in different directions, a transfer drive assembly comprising an input shaft and two output shafts, said input shaft connected to said output shaft of said transmission, means connecting one of said output shafts of said transfer drive unit to drive said traction means for said tractor unit, a hydraulic pump, gearing means connecting said hydraulic pump to the other output shaft of said transfer drive assembly for operation of said hydraulic pump, a hydraulic motor carried by said trailer unit, second gearing means connecting said hydraulic motor to drive said traction means for said trailer unit, and hydraulic fluid conduit means connected between said hydraulic pump and said hydraulic motor for operation of said hydraulic motor by said hydraulic pump, said hydraulic fluid conduit means comprising a plurality of check valves and a hydraulic fluid reservoir, said check valves operating to direct hydraulic fluid between said hydraulic pump and said hydraulic motor in directions causing operation of said traction means for said trailer unit in directions corresponding to the directions of operation of said traction means for said tractor unit.

13. In a vehicle as claimed in claim 12 wherein said second gearing means comprises a planetary set of three members, said hydraulic motor connected to drive one of said members of said planetary set, the second of said three members connected to drive the traction means for said trailer unit, and a selectively operable brake for the third member of said three members of said planetary set.

14. In a vehicle as claimed in claim 13, wherein said first gearing means comprises a second planetary set of three members, said other output shaft of said transfer drive assembly connected to drive one of said members of said second planetary set, the second of said three members connected to drive said hydraulic pump, and a selectively operable brake for the third member of said three members of said second planetary set.

15. In a vehicle, a tractor unit supported by traction means, a trailer unit supported by traction means, means connecting said units for pivotal movement therebetween, steering means mounted between said units for selectively pivoting one of said units relative to the other about a vertical axis, an engine carried by said tractor unit, a power divider comprising a planetary set, means connecting one member of said planetary set to be driven by said engine, a mechanical power train connected to drive said traction means for said tractor unit, means connecting another of the members of said planetary set to drive said mechanical power train, a hydraulic pump, means connecting the remaining member of said planetary set to drive said hydraulic pump, a hydraulic motor carried by said trailer unit, means connecting said hydraulic motor to drive said traction means for said trailer unit, and hydraulic fluid conduit means connected between said hydraulic pump and said hydraulic motor for operation of said hydraulic motor by said hydraulic pump.

16. In a vehicle, a tractor unit supported by traction means, a trailer unit supported by traction means, means connecting said units for pivotal movement therebetween, steering means mounted between said units for selectively pivoting one of said units relative to the other about a vertical axis, an engine carried by said tractor unit, a power divider comprising a planetary set, means connecting one member of said planetary set to be driven by said engine, a mechanical power train connected to drive said traction means for said tractor unit, means connecting another of the members of said planetary set to drive said mechanical power train, a hydraulic pump, means connecting the remaining member of said planetary set to drive said hydraulic pump, a hydraulic motor carried by said trailer unit, hydraulic fluid conduit means connected between said hydraulic pump and said hydraulic motor for operation of said hydraulic motor by said hydraulic pump, planetary type gearing means comprising an input shaft and an output shaft, said gearing means including a brake so that upon operation of said brake said input shaft is connected to drive said output shaft at a lower speed than said input shaft and so that when said brake is off said output shaft is free to rotate relative to said input shaft, said input shaft connected to be driven by said hydraulic motor and said output shaft connected to drive said traction means for said trailer unit.

17. In a vehicle, a tractor unit supported by traction means, a trailer unit supported by traction means, means connecting said units for pivotal movement therebetween, steering means mounted between said units for selectively pivoting one of said units relative to the other about a vertical axis, an engine carried by said tractor unit, a power divider comprising a planetary set, means connecting one member of said planetary set to be driven by said engine, a machanical power train including a selectively operable transmission connected to drive said traction means for said tractor unit at different speeds and in different directions, means connecting another of the members of said planetary set to drive said mechanical power train, a hydraulic pump, means connecting the remaining member of said planetary set to drive said hydraulic pump, whereby the amount of engine torque delivered to said mechanical power train will be proportional to the torque reaction of said hydraulic pump and the amount of said engine torque delivered to said hydraulic pump will be proportional to the torque reaction of said mechanical power train, gearing means connecting said hydraulic motor to drive said traction means for said trailer unit, and hydraulic fluid conduit means including valving selectively operable to direct hydraulic fluid between said hydraulic pump and said hydraulic motor in either direction and to disconnect any hydraulic fluid flow from said hydraulic pump to said hydraulic motor and blocking the outlet of said hydraulic pump.

18. In a vehicle as claimed in claim 17 wherein said gearing means comprises a second planetary set of three members, said hydraulic motor connected to drive one of said members of said second planetary set, the second of three members connected to drive the traction means for said trailer unit, and a selectively operable brake for the third member of said three members of said second planetary set.

References Cited in the file of this patent

UNITED STATES PATENTS

| | | |
|---|---|---|
| 1,874,604 | Roche | Aug. 30, 1932 |
| 2,406,944 | Choate et al. | Sept. 3, 1946 |
| 2,626,001 | Antle | Jan. 20, 1953 |
| 2,729,298 | Le Tourneau | Jan. 3, 1956 |